(12) United States Patent
Delisle et al.

(10) Patent No.: US 7,311,647 B2
(45) Date of Patent: Dec. 25, 2007

(54) METHODS FOR SENSING FEATURES ON MOVING FASTENER TAPE DURING AUTOMATED PRODUCTION

(75) Inventors: Victor Delisle, Roswell, GA (US); Clifton Ronald Howell, Buford, GA (US); Kevin Owen, Flowery Branch, GA (US)

(73) Assignee: Illinois Tool Works Inc., Glenview, IL (US)

( * ) Notice: Subject to any disclaimer, the term of this patent is extended or adjusted under 35 U.S.C. 154(b) by 23 days.

(21) Appl. No.: 11/125,755

(22) Filed: May 9, 2005

(65) Prior Publication Data

US 2006/0252626 A1 Nov. 9, 2006

(51) Int. Cl.
*B31B 1/00* (2006.01)
*B31B 1/84* (2006.01)
*B65B 51/04* (2006.01)

(52) U.S. Cl. .................. 493/10; 493/19; 493/213; 493/394; 493/927; 53/133.4; 53/139.2

(58) Field of Classification Search .............. 493/3, 493/8, 10, 11, 13–15, 17–19, 22, 34, 37, 393, 493/394, 213, 214, 927; 53/51, 133.4, 139.2
See application file for complete search history.

(56) References Cited

U.S. PATENT DOCUMENTS

| | | | | |
|---|---|---|---|---|
| 4,380,446 A | * | 4/1983 | Dickson et al. ............... 493/11 |
| 5,022,950 A | * | 6/1991 | Ingalls et al. .................. 53/51 |
| 5,088,971 A | * | 2/1992 | Herrington .................. 493/927 |
| 5,505,037 A | * | 4/1996 | Terminella et al. ......... 53/133.4 |
| 5,554,262 A | * | 9/1996 | Turner ......................... 162/198 |
| 5,746,043 A | * | 5/1998 | Terminella et al. ........... 53/551 |
| 6,003,582 A | * | 12/1999 | Blohowiak et al. ......... 493/213 |
| 6,217,497 B1 | * | 4/2001 | Laudenberg .................. 493/11 |
| 6,234,943 B1 | * | 5/2001 | Copin .......................... 493/11 |
| 6,516,850 B1 | | 2/2003 | Blohowiak et al. |
| 6,733,622 B2 | * | 5/2004 | McMahon et al. ......... 156/580.2 |
| 6,820,399 B2 | * | 11/2004 | Send ............................. 53/51 |
| 6,863,754 B2 | * | 3/2005 | Wright et al. .................. 156/64 |
| 6,878,103 B2 | * | 4/2005 | Ackermann .................. 493/13 |
| 7,056,417 B2 | * | 6/2006 | Haws et al. ............. 156/580.2 |
| 2003/0183315 A1 | * | 10/2003 | McMahon et al. ....... 156/580.2 |

FOREIGN PATENT DOCUMENTS

| EP | 1477293 A | 11/2004 |
|---|---|---|
| WO | WO03/039847 A | 5/2003 |

* cited by examiner

*Primary Examiner*—Louis Huynh
(74) *Attorney, Agent, or Firm*—Ostrager Chong Flaherty & Broitman P.C.

(57) ABSTRACT

A method of manufacture comprises the following steps: (a) advancing a fastener tape made of flexible thermoplastic material along a process pathway during an indexing portion of a work cycle, the fastener tape not advancing during a dwell time of the work cycle; (b) during each dwell time, deforming the fastener tape at a first fixed station situated along the process pathway; (c) transmitting light toward the fastener tape at a second fixed station while the fastener tape is advancing; and (d) photodetecting a portions of the transmitted light after some or all of the transmitted light has passed the fastener tape, the photodetected portions of the transmitted light being converted into electrical signals; wherein the distance of the fastener tape advanced in step (a) is determined in accordance with an algorithm that takes into account characteristics of electrical signals acquired in step (d) during earlier work cycles.

17 Claims, 7 Drawing Sheets

METHODS FOR SENSING FEATURES ON MOVING FASTENER TAPE DURING AUTOMATED PRODUCTION

BACKGROUND OF THE INVENTION

The present invention generally relates to methods for sensing structural features on a moving fastener tape during the automated manufacture of reclosable packaging. In particular, the invention relates to methods for sensing deformations or attached articles on a plastic fastener tape of the type comprising a pair of mutually interlocked zipper strips, the latter having a length sufficient to form multiple package-length zippers when processed on a bag making machine, thermoformed packaging machine, form-fill-seal machine or other machine for making reclosable packaging.

During the automated manufacture of reclosable packages, typically a thermoplastic fastener tape unwound from a supply reel or spool is joined (e.g., by conductive heat sealing) to a web of thermoplastic packaging material. The web-to-fastener tape sealing operation can be performed either intermittently (i.e., during dwell times interspersed between intermittent advancements) or continuously (i.e., while the fastener tape and web are advancing continuously).

In cases where a fastener tape without pre-sealing and without sliders must be joined with a web of packaging material, there is a need for the fastener tape to be properly aligned with the web of film (i.e., straightness and cross-machine alignment), but there is no need to register the fastener tape relative to the web in a machine direction. This is due to the fact that the fastener tape has a constant profile along its length and thus has no structural features that need to be registered relative to respective package-length sections of the web of packaging material.

The fastener tape typically comprises a pair of continuous zipper strips, each zipper strip having a respective constant profile produced by extrusion. Typically, the respective zipper strip profiles have complementary shapes that allow the zipper strips to be interlocked. These closure profiles may be of the rib-and-groove variety, the interlocking-hook variety or any other suitable fastenable structures. Pre-sealing of the fastener tape involves crushing and fusing the closure profiles and, if the zipper strips are flanged, the zipper flanges as well at spaced intervals along the fastener tape at locations where the fastener tape will be ultimately cut when each finished package is severed from the work in process. Pre-sealing may be accomplished by ultrasonic stomping or thermal crushing. In cases where the fastener tape is pre-sealed before entering the packaging machine, it is desirable that the midplane of each pre-seal be registered within a maximum allowable deviation relative to a corresponding cut line.

In cases where sliders are inserted at spaced intervals along the fastener tape before the latter enters the packaging machine, it is common to combine the joinder of the closure profiles at spaced intervals with the formation of slider end stop structures on the fastener tape. Although slider end stops can be attached to or inserted on the fastener tape, it is common practice to simply deform and fuse the thermoplastic material of the closure profiles strips wherever slider end stops are needed. Typically, the zipper material is softened by applying ultrasonic wave energy and the thus-softened zipper material is shaped to form a slider end stop structure. If the zipper has flanges, the zipper flanges can be fused during the same ultrasonic stomping operation or during a separate thermal crushing operation. The slider end stop structure, when bisected by a cut line, will form back-to-back slider end stops for adjacent packages. The slider end stop structure is formed at a location such that its midplane will be generally coplanar with the plane of cutting when the finished package is severed from the work in process. Thus, it is important that the midplane of each slider end stop formation on the fastener tape be registered within a maximum allowable deviation relative to a corresponding cut line.

During the initial setup of a machine that joins a fastener tape to a web or webs of packaging material, the midplane of a leading pre-seal or slider end stop structure may be manually aligned with the cutting blade that severs the completed package from the work in process. There is a need for means to ensure that each subsequently formed pre-seal or slider end stop structure will ultimately arrive at a position whereat its midplane will also be generally aligned with the cutting blade. One method of accomplishing the foregoing involves the step of sensing or detecting the passage of each pre-seal or slider end stop structure (or each slider) at a fixed location during fastener tape advancement. This information is then used to adjust the distance by which the fastener tape is advanced in the interval between successive pre-sealing or slider end stop formation (with concurrent slider insertion) operations.

Thus, there is a need for an accurate and reliable method for sensing or detecting a repeating structural feature formed on or attached to a moving fastener tape as it passes a fixed location in a packaging machine.

BRIEF DESCRIPTION OF THE INVENTION

The present invention is directed to methods for sensing reoccurring structural features on a moving fastener tape during automated production of reclosable packages. The invention is also directed to apparatus for implementing such methods. The invention takes advantage of the fact that the structural features of interest, when exposed to impinging beams of light (e.g., LED beams), will produce changes in those light beams that can be optically detected, thereby allowing the arrival of the structural feature or a boundary thereof at a fixed location to be detected.

One aspect of the invention is a method of manufacture comprising the following steps: (a) during a respective indexing portion of a respective work cycle, advancing a fastener tape made of flexible thermoplastic material along a process pathway, the fastener tape not advancing during a respective dwell time of the respective work cycle; (b) during each dwell time, forming or attaching a respective structural feature of a type on the portion of the fastener tape that is resident at a first fixed station situated along the process pathway, the structural features of the type being spaced at intervals along the portion of the fastener tape that is downstream of the first fixed station; (c) while the fastener tape is advancing along the process pathway during the indexing portion of each work cycle, transmitting light toward a volume of space at a second fixed station, the process pathway intersecting and passing through the volume of space; and (d) photodetecting at least portions of the transmitted light after some or all of the transmitted light has entered and then exited the volume of space at the second fixed station, the photodetected portions of the transmitted light being converted into electrical signals.

Another aspect of the invention is a method of manufacture comprising the following steps: (a) during a respective indexing portion of a respective work cycle, advancing a fastener tape made of transparent or translucent flexible thermoplastic material along a process pathway, the fastener tape not advancing during a respective dwell time of the respective work cycle; (b) during each dwell time, inserting a respective slider on the portion of the fastener tape that is resident at a first fixed station situated along the process pathway, the sliders being spaced at intervals along the portion of the fastener tape that is downstream of the first fixed station, each slider being substantially opaque; (c) while the fastener tape is advancing along the process pathway during the indexing portion of each work cycle, transmitting light toward a portion of the fastener tape in a volume of space at a second fixed station, respective portions of the sliders also passing through the volume of space; and (d) photodetecting those portions of the transmitted light that pass through the portion of the fastener tape resident in the volume of space and that are not blocked by a slider; the photodetected portions of the transmitted light being converted into electrical signals that undergo a change in amplitude in response to a leading edge of the slider moving into the path of the transmitted light.

A further aspect of the invention is a method of manufacture comprising the following steps: (a) during a respective indexing portion of a respective work cycle, advancing a fastener tape along a process pathway, the fastener tape not advancing during a respective dwell time of the respective work cycle, and the fastener tape comprising first and second zipper strips made of flexible thermoplastic material; (b) during each dwell time, deforming and fusing respective portions of the first and second zipper strips that are resident at a first fixed station situated along the process pathway to form a respective zone of fusion, the zones of fusion being spaced at intervals along the portion of the fastener tape that is downstream of the first fixed station; (c) while the fastener tape is advancing along the process pathway during the indexing portion of each work cycle, transmitting light toward a volume of space at a second fixed station, the process pathway intersecting and passing through the volume of space; and (d) photodetecting at least portions of the transmitted light after some or all of the transmitted light has entered and then exited the volume of space at the second fixed station, the photodetected portions of the transmitted light being converted into electrical signals.

Yet another aspect of the invention is a system comprising a fastener processing machine, a fastener tape comprising mutually interlocked first and second zipper strips made of flexible material that follow a process pathway through the fastener processing machine, and a controller for controlling the operation of the fastener processing machine, wherein: the fastener processing machine comprises a supply reel having a portion of the fastener tape wound thereon with a paid-out portion of the fastener tape connected thereto, a device for attaching or forming a respective structural feature of a type on the section of the paid-out portion of the fastener tape that is resident in a fixed zone along the process pathway, means for advancing the section that is resident in the fixed zone along the process pathway, and an optical sensor that detects a boundary of each passing structural feature of the type as the fastener tape is advanced along the process pathway; and the controller is programmed to control the operation of the device and the fastener tape advancing means so that during an advancement phase of each work cycle, the fastener tape advancing means advances the fastener tape; and during a dwell time of each work cycle, the device is activated, and is further programmed to adjust the distance that the fastener tape advancing means advances the fastener tape during a particular work cycle in accordance with an algorithm that takes into account characteristics of electrical signals output by the optical sensor during work cycles preceding the particular work cycle.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

For the purpose of describing various methods of optically detecting reoccurring structural features on an advancing fastener tape during automated production, an exemplary fastener tape having sliders inserted at spaced intervals therealong will be described with reference to FIGS. 1 and 2. Several methods of optical detection will then be described with reference to this exemplary slider/fastener tape assembly. However, it should be understood that the invention is not limited in its application to the particular slider/fastener tape assembly depicted in FIGS. 1 and 2. The broad scope of the invention will be apparent from the claims that follow this detailed description.

Figure 1:
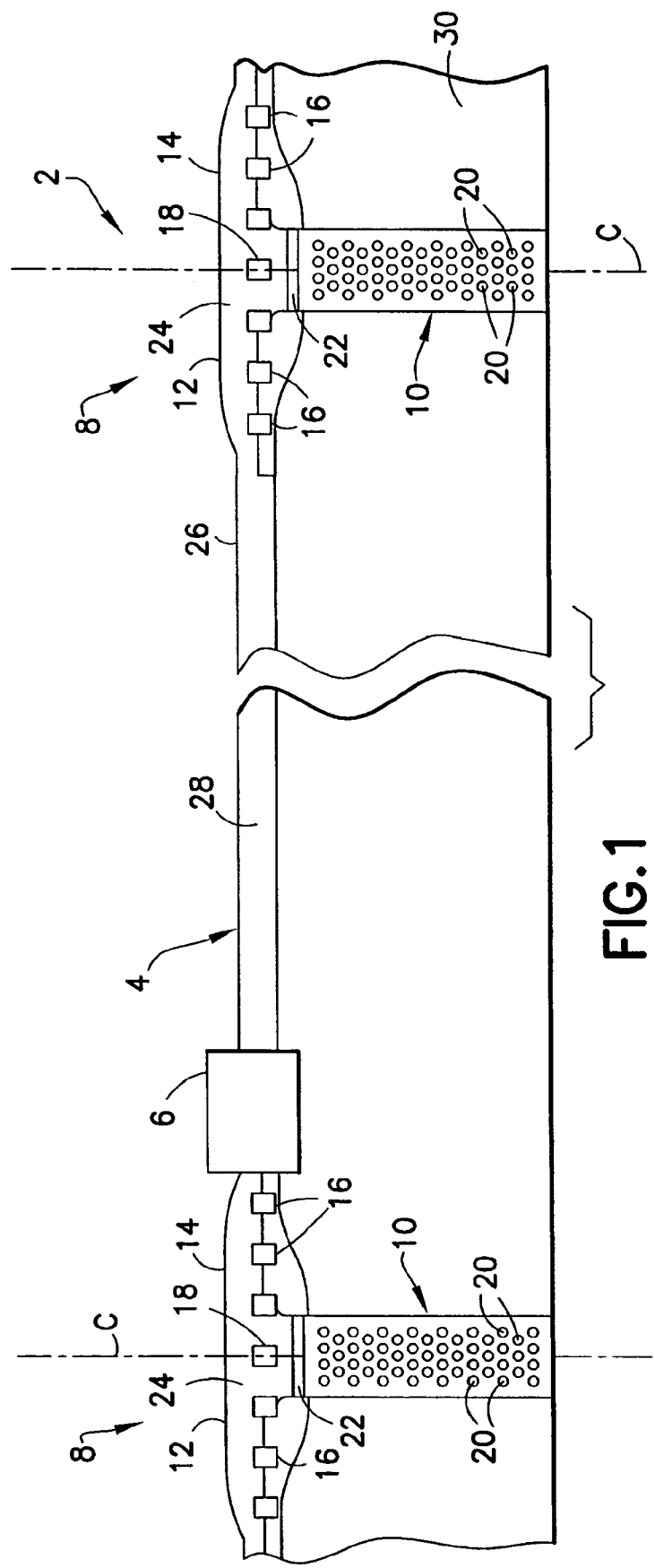
FIG. 1 is a drawing showing a front view of portions of one known type of a slider-zipper assembly having structural features, such as sliders and ultrasonically stomped slider end stop formations and zipper flange joints, which are detectable using the present invention.
Figure 2:
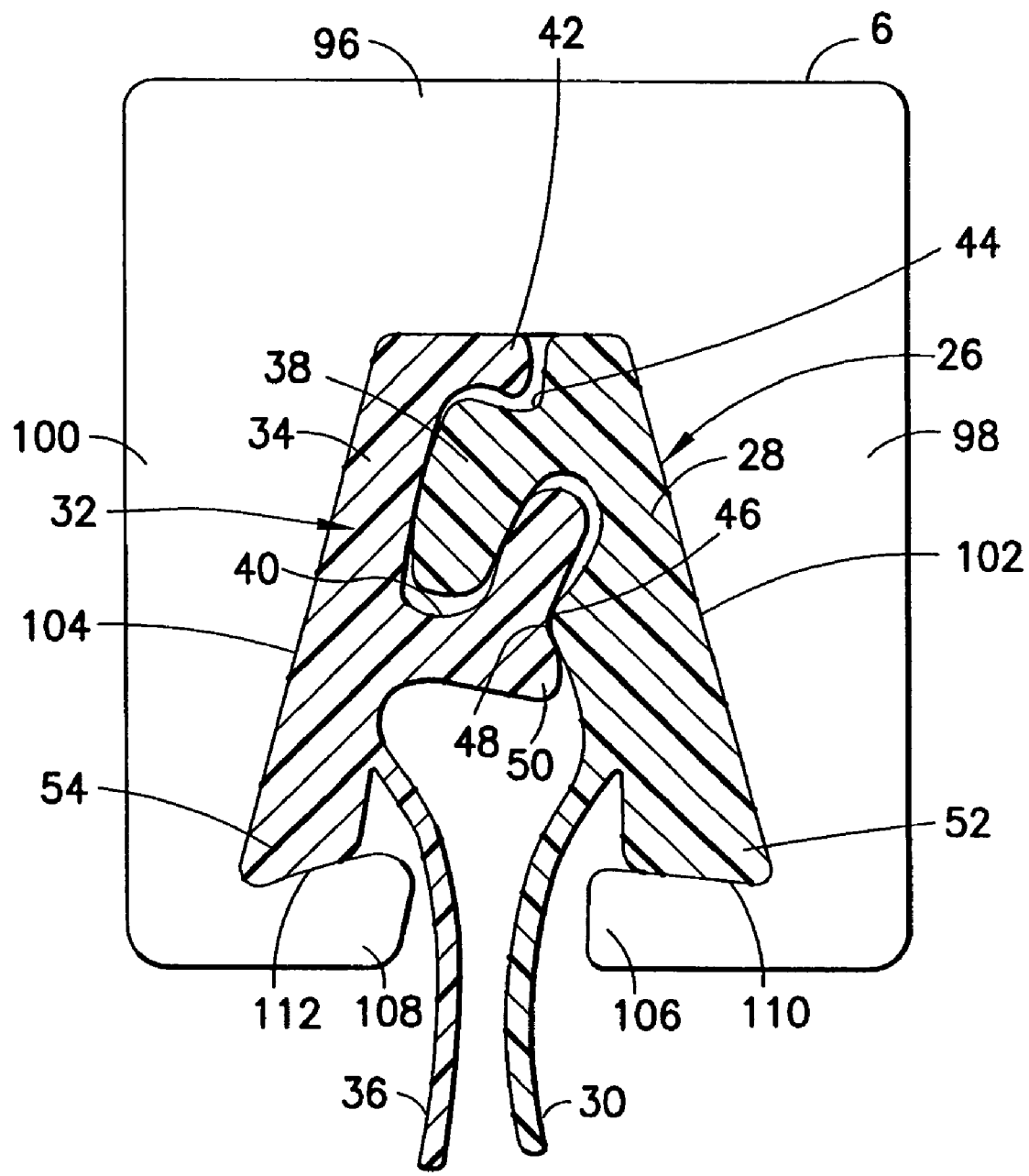
FIG. 2 is a cross-sectional view (taken along section line 2-2 indicated ion FIG. 1) of the slider-operated plastic zipper depicted in FIG. 1, except that the zipper flanges have been abbreviated in length.

The slider/fastener tape assembly depicted in FIGS. 1 and 2 may be manufactured using a process involving concurrent formation of slider end stop structures and sealing of zipper flanges at spaced intervals along a pair of interlocked flanged zipper strips unwound from a roll or spool. The flanged zipper strips are typically produced by extrusion so that initially they have a constant profile along their length. The zipper strips have complementary closure profiles and respective zipper flanges formed during the extrusion process. In the embodiments disclosed herein, the forming/sealing operation is carried out by applying ultrasonic wave energy to the zipper material. However, instead of ultrasonic wave energy, thermal or conduction heat sealing methods may be used. Sufficient energy (ultrasonic or thermal) is applied to the zipper or closure profiles in a first zone and to the zipper flanges in a second zone to soften and merge the plastic material in both zones, the merged material forming a zone of fusion upon cooling. Each zone of fusion has a plane of symmetry, the planes of symmetry being spaced, for a typical application, along the zipper at intervals approximately equal to one package length. Each zone of fusion is also shaped to form a pair of slider end stops that are joined at their backs, until when the zipper is cut along the plane of symmetry in the bag making or packaging machine, as described in detail below.

The operations described in the preceding paragraph can also be employed for sliderless flanged zippers. In this case the closure profiles are deformed and fused to form zipper pre-seals instead of slider end stops. As previously described, "pre-sealing" involves flattening the zipper prior to merging with the packaging material at a position that will ultimately correspond to the package edge. The pre-sealing operation facilitates sealing the sides of the package in the area of the zipper.

In accordance with one method of manufacturing the slider/fastener tape assembly seen in FIGS. 1 and 2, the interlocked zipper strips are advanced intermittently and then the forming/sealing operation is repeated during each dwell time between successive advancements. Typically, sliders are inserted at a station downstream from the ultrasonic stomping station. The resulting slider/fastener tape assembly comprises a chain of connected zipper lengths, each zipper length having a respective slider. This chain can be wound on a spool for storage or transport, or the chain can be fed directly to a packaging machine.

In the embodiments of the invention disclosed herein, slider end stops are formed and the zipper flanges are sealed before the fastener tape is joined to film in a packaging machine. A section of a slider/fastener tape assembly 2 is depicted in FIG. 1. The assembly 2 comprises a fastener tape 4 having a multiplicity of sliders 6 (only one of which is shown in FIG. 1) mounted thereon. Each slider 6 is of the straddling type, i.e., the slider has no separating finger and thus requires that slider end stops be provided at the ends of each zipper section.

The fastener tape 4 comprises a pair of interlockable zipper strips 26 and 32 (see FIG. 2) having respective flanges 30 and 36 extending from respective closure profiles 28 and 34. In the view of FIG. 1, only the zipper strip 26 is visible. The closure profiles of the two zipper strips have complementary (i.e., interlocking) shapes. Although FIG. 2 shows a rib and groove arrangement, the closure profiles of the zipper strips may take any form. For example, the zipper may comprise interlocking rib and groove elements or alternating hook-shaped closure elements. The zipper strips 26 and 32 are made of translucent or transparent thermoplastic material. The preferred zipper material is polyethylene or polypropylene.

To facilitate opening and closing of each zipper after it has been installed in the mouth of a package or bag, each package-length section of the fastener tape is provided with a respective straddling slider 6, as shown in FIGS. 1 and 2. The slider 6 can be top-loaded onto the zipper without having to disengage the profiled structures at the loading point since the slider does not make use of a separating finger. The closure profiles 28 and 34 are engaged, i.e., interlocked, with each other as the slider travels in the closing direction. Conversely, the closure profiles 28 and 34 are disengaged from each other as the slider travels in the opening direction. The slider 6 may be made in multiple parts and welded together or the parts may be constructed to be snapped together. The slider may also be of one-piece construction. The slider can be made using any desired method, such as injection molding. The slider can be molded from any suitable plastic, such as nylon, polypropylene, polystyrene, acetal, polyketone, polybutylene terephthalate, high-density polyethylene, polycarbonate, or ABS. Typically, the slider is made of opaque material, in contrast to the zipper, which is translucent or transparent.

FIG. 2 depicts a closing end of the slider 6, with the zipper shown in cross section. The closing end is shaped to force the closure profiles 28 and 34 into engagement when the slider 14 travels in the closing direction. During slider travel in the closing direction, the closing end is the trailing end of the slider. As shown in FIG. 2, the slider 6 straddles the zipper and has a top wall 96 from which a first side wall 98 and a second side wall 100 depend. The first side wall 98 has an inner surface 102 and the second side wall 100 has an inner surface 104. The slider inner surfaces 102 and 104 are divergent with respect to each other in the same manner as the outer surfaces of the closure profiles, and are spaced to push the closure profiles 28 and 34 into engagement as the slider 6 is moved along the zipper in the closing direction. The slider side walls 98 and 100 are respectively provided with retaining shoulders 106 and 108 having upper surfaces 110 and 112 that mate with the lower surfaces of the rails 52 and 54 of the closure profiles. These mating surfaces may be tapered to maximize their pull-off resistance.

Opening of the zipper is achieved when the slider 6 is moved in the opening direction. Although not shown, at the opening end of the slider, the slider side walls have inner surfaces that are substantially parallel, rather than divergent as at the closing end (shown in FIG. 2). As the slider is moved in the opening direction and the slider side wall inner surfaces change from the "A" configuration of surfaces 102 and 104 (see FIG. 2) to a substantially parallel configuration of surfaces (not shown) at the opening end of the slider, the rails 52 and 54 are forced towards each other, thereby forcing the fulcrum members 46 and 48 into a tighter relationship and causing the rib 38 and groove 40 to pivot oppositely about the fulcrum 50. Simultaneously, a retaining shoulder (not shown) on the slider side wall 98 forces the male profile upwardly, while a shoulder (not shown) forces the female profile downwardly, causing the convex male fulcrum member 46 (see FIG. 2) to cam upwardly along the concave female fulcrum member 48. Thus, the resulting action is a simultaneous pivoting of the closure profiles 28 and 34 oppositely about the fulcrum 50 and an upward translation of the closure profile 28 relative to the closure profile 34, resulting in disengagement of the profiled structures. A cavity (not shown in FIG. 2) in the slider top 96 accommodates the upward translation of the male closure profile 28.

During bag or package manufacture, the top marginal portions of the front and rear walls of the receptacle (not shown in FIGS. 1 and 2) of the bag or package are respectively sealed to the zipper flanges 30 and 36 by a conventional conduction heat sealing technique. Alternatively, the front and rear walls may be extended beyond the zones of wall/zipper flange joinder and joined to each other at the top marginal portions to form a header that shrouds the slider/zipper assembly. The receptacle may be made from any suitable film material, including thermoplastic film materials such as low-density polyethylene, substantially linear copolymers of ethylene and a C3-C8 alpha-olefin, polypropylene, polyvinylidene chloride, mixtures of two or more of these polymers, or mixtures of one of these polymers with another thermoplastic polymer. The person skilled in the art will recognize that this list of suitable materials is not exhaustive. Although not intended in a limitative sense, it is noted that the thickness of the film is preferably 2 mils or less.

For the slider/fastener tape assembly partially depicted in FIG. 1, a multiplicity of zones 8 of fused zipper material are formed, at spaced intervals along a lengthwise direction, by the application of heat and pressure to the zipper material. The heat may be generated by the application of ultrasound wave energy as the fastener tape is pressed between a horn and an anvil of an ultrasonic welding assembly, e.g., of the type disclosed in disclosed in U.S. patent application Ser. No. 10/439,847, entitled "Method and Apparatus for Sealing Flanges and Deforming Profiles of Plastic Zipper". Each zone of fusion 8 is generally T-shaped. Each slider 6 is mounted to a respective unfused section disposed between successive zones of fusion 8. Each zone of fusion 8 comprises a first area wherein the closure profiles of the interlocked zipper strips are fused to each other and deformed, and a second area wherein the zipper flanges of the interlocked zipper strips are fused to each other and deformed.

The aforementioned first area of the zone of fusion extends in the lengthwise direction and forms the top of the T shape. During the forming/sealing operation, some of the plastic material of the zipper profiles is deformed and pushed upward to form the extended hump seen in FIG. 1. Also, some of the plastic material of the zipper profiles in the zone of fusion is deformed and pushed downward. In the forming process, a generally flattened surface 24 is formed in each zone of fusion 8. In addition, a row of spaced indentations is formed on one side of the zone of fusion 8 in the first area where the profiles are fused. A central indentation 18 is disposed along a plane of symmetry of the zone of fusion 8, which plane is indicated by the dashed line designated by the letter "C" in FIG. 1. Other indentations 16 (in this example, three on each side of the central indentation) are formed along a line generally perpendicular to line C, as seen in FIG. 1. These indentations are impressed on only one side of the fastener tape by respective teeth formed on the ultrasonic horn, as fully disclosed in U.S. patent application Ser. No. 10/439,847. The teeth act as vertical energy directors to penetrate the heat into the center of the zipper directly into the fulcrum area of the profiles.

When the zipper is later cut along line C, the deformed and fused zipper profiles form respective slider end stops 12 and 14 on separate packages. In this sense, the first area of the zone of fusion comprises back-to-back end stops. These end stops prevent the slider from sliding off the ends of the zipper when the slider reaches the closed or fully opened position. Such end stops perform dual functions, serving as stops to prevent the slider from going off the end of the zipper and also holding the two zipper profiles together to prevent the bag from opening in response to stresses applied to the profiles through normal use of the bag.

The aforementioned second area of the zone of fusion 8 extends transverse to the lengthwise direction and forms the stem of the T shape. During the forming/sealing operation, some of the plastic material of the zipper flanges is deformed and merged to form a flange seal 10. The flange seal 10 comprises an array of dimples 20. Alternatively, an array of mutually parallel spaced grooves extending generally parallel to the line C may be formed. The dimples (or grooves) 20 are impressed on the same side of the zipper that the above-described indentations are formed. The dimples and indentations are formed and the surface 24 is flattened in one operation. A generally planar transitional surface 22 is also formed between the flattened surface 24 and the flange seal 10. In a later stage of manufacture, respective webs (or folded sides of the same web) of the packaging material will be sealed to the opposite faces of each flange seal and will be sealed to each other along side seams aligned with the flange seals 10.

In accordance with the embodiments of the invention disclosed hereinafter, various structural features (or boundaries thereof) of the slider/fastener tape assembly 2 shown in FIG. 1 can be optically detected, such as the zipper flange seals 10, the slider end stop formations 12 and 14, and the slider 6. It should be appreciated, however, that the optical detection methods disclosed hereinafter can be employed with sliders and fastener tapes constructed differently than the construction shown in FIGS. 1 and 2.

Figure 3:
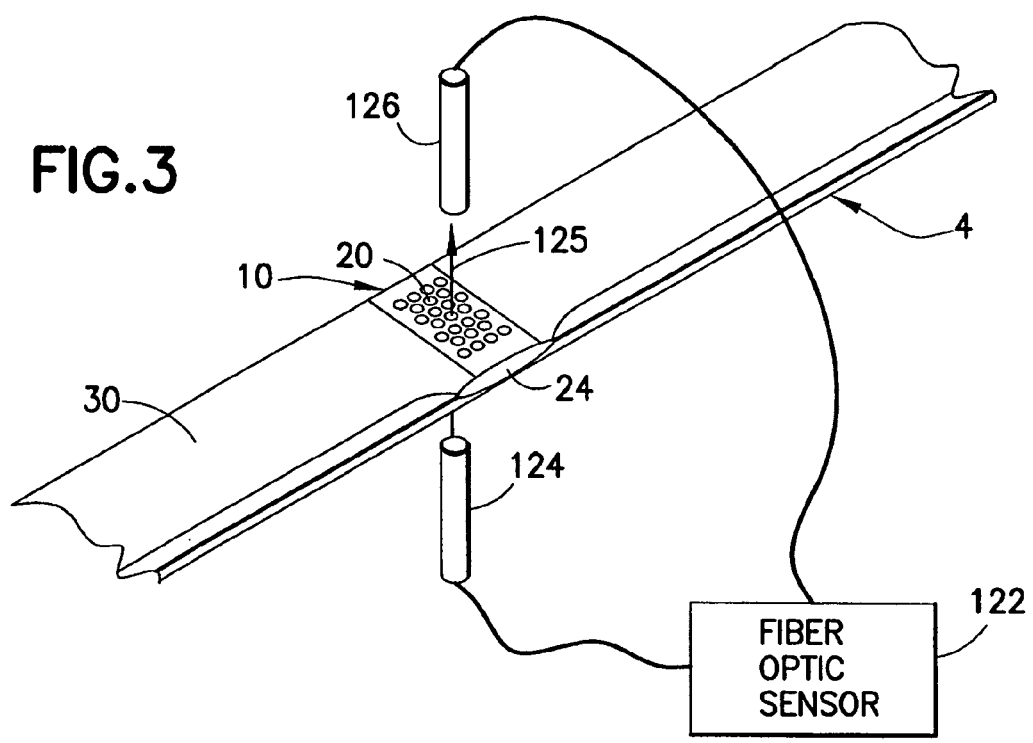
FIG. 3 is an isometric view of a fiber optic sensor being used to detect a zone where the zipper flanges are fused together in accordance with one embodiment of the present invention.

A method of optically detecting structural features formed on or attached to a fastener tape in accordance with one embodiment of the invention is shown in FIG. 3. The fastener tape 4 is the same as that previously described with reference to FIG. 1, except that no sliders are shown in FIG. 3. This method employs a fiber optic sensor 122 that has an output port connected to an optical fiber 124 and an input port connected to an optical fiber 126. The optical fibers 124 and 126 must be fixed in respective positions on opposite sides of the zipper flanges of the moving fastener tape 4, with the respective distal portions of the optical fibers aligned so that portions of a beam of light exiting the transmitting optical fiber 124 and passing through the zipper flanges will enter the receiving optical fiber 126 and be returned to the fiber optic sensor 122. This may be accomplished, for example, by passing the slider/fastener tape assembly through a slotted slider guide, to which a sensor mount (that supports the ends of the optical fibers in the required relationship) is mounted. The beam of light from one optical fiber passes through the slots in the slider guide and through the fastener tape and into the other optical fiber.

The fiber optic sensor 122 may comprise a light-emitting diode for outputting an LED beam at the output port to which the transmitting optical fiber 124 is connected and a photodetector for detecting the portion of the transmitted LED beam 125 that passes through the fastener tape and enters the receiving optical fiber 126 (disregarding the ambient light that enters the receiving optical fiber for purposes of this discussion). The photodetector inside the fiber optic sensor 122 converts impinging light into an electrical signal having an amplitude proportional to the intensity of the impinging light, which electrical signal is then amplified. The LED beam emitted from the transmitting optical fiber 124 has a constant intensity, whereas the intensity of the light entering the receiving optical fiber 126 will depend on the portion of the transmitted LED beam that passes through the fastener tape, which in turn will depend on the structure of the fastener tape at the location where the LED beam passes through.

In the implementation depicted in FIG. 3, the LED beam is targeted at the zipper flanges of the fastener tape and is oriented generally perpendicular to the plane of the zipper flanges. However, it is preferred that the LED beam be directed at a non-perpendicular angle (e.g., 30 degrees from the plane of the zipper flanges). As the fastener tape advances along a process pathway, the structure of the fastener tape exposed to the LED beam changes. Over the major portion of each package-length section of the fastener tape, the LED beam is transmitted through unjoined sections of two zipper flanges that are separated by an air gap, the translucence of these unjoined sections of the zipper flanges being unaltered. In contrast, over a minor portion of each package-length section of the fastener tape, i.e., across each flange seal 10, the LED beam is transmitted through a section where the two zipper flanges are fused together. The fused zipper flanges have a translucence that is less than the translucence of the unaltered zipper flanges, resulting in a decrease in the intensity of the light arriving at the photodetector inside the fiber optic sensor 122. The fiber optic sensor 122 has a digital display for indicating the intensity of the received light and also outputs an electrical signal representing the received light intensity to a PLC (not shown in FIG. 3). The stream of electrical feedback to the PLC contains information indicating the instants of time when the leading and lagging edges respectively of the moving flange seal 10 cross the path of the transmitted LED beam. The PLC receives similar information for each successive flange seal that crosses the LED beam.

Using the foregoing optical detection technique, the PLC is able to acquire information representing the instants of time when the leading edges of successive flange seals cross the path of the transmitted LED beam. However, this information alone does not indicate the distance separating the leading edges of successive flange seals. Additional means may be provided for determining the distance that the section of fastener tape with flange seals has traveled in the intervals between successive flange seal leading edge detection events. An example of such means will be disclosed later herein with reference to FIG. 8.

In accordance with a variation of the optical detection technique depicted in FIG. 3, the optical fibers 124 and 126 can be positioned so that the sliders on the moving fastener tape will cross the path of the LED beam. In this case, the opaque slider will completely block the LED beam, so that the stream of electrical feedback to the PLC contains information indicating the instants of time when the leading and lagging edges respectively of the moving slider cross the path of the LED beam. Before and after the slider is blocking the LED beam, at least a portion of the transmitted LED beam will reach the receiving optical fiber 126. For example, the optical fibers could be positioned such that the LED beam passes through the closure profiles when the slider is absent. However, since the slider extends above and below the closure profiles, a person skilled in the art will readily appreciate that the LED beam could be aimed at a location above or below the closure profiles while still impinging on each passing slider.

Suitable fiber optic sensors are marketed under the product designation FS-V20 Series by Keyence Corporation.

Figure 4:
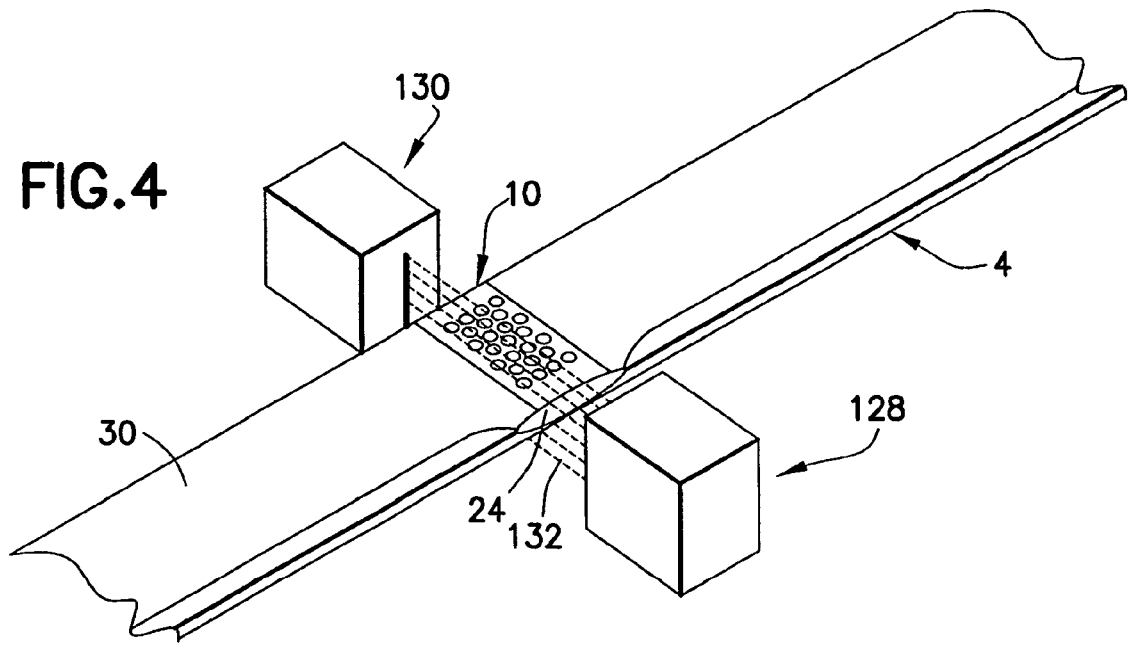
FIG. 4 is an isometric view of a laser scan micrometer being used to detect a change in thickness in a zone where the closure profiles are flattened and fused together in accordance with another embodiment of the present invention.

A method of optically detecting structural features formed on or attached to a fastener tape in accordance with another embodiment of the invention is shown in FIG. 4. Again, the fastener tape 4 is the same as that previously described with reference to FIG. 1, except that no sliders are shown in FIG. 4. This method employs a laser scanning micrometer comprising a laser scanning transmitter 128 and a laser scanning receiver 130, which are separated by a scanning gap across which a laser beam is scanned in a vertical plane. The fastener tape 4 is passed between the laser scanning transmitter and receiver with the zipper flanges disposed in a plane which is generally parallel to the scanning laser beams 132. The laser scanning transmitter and receiver must have a fixed relationship to each other, with the scanned laser beams being directed into a slit formed on the housing of the laser scanning receiver 130. Typically, this fixed relationship is maintained by mounting the transmitter 128 and the receiver 130 on opposite ends of a rigid platform (not shown in FIG. 4).

The laser scanning transmitter 128 scans a laser beam in a vertical plane to create a curtain of laser beams 132 that are interrupted by any intervening portions of the fastener tape. Over the majority of each package-length section of the fastener tape, the closure profiles are not crushed and therefore the full width of the interfering interlocked closure profiles will create a gap in the curtain of laser beams received by the laser scanning receiver 130. The received laser beams are converted into electrical signals, which are output to the PLC (not shown in FIG. 4). The PLC is programmed to compute the height of the gap in the curtain of received laser beams, which height is equivalent to the thickness of the uncrushed closure profiles. In a minor portion 24 of each package-length section of the fastener tape, the closure profiles are crushed and therefore the reduced width of the interfering crushed closure profiles will create a gap in the curtain of laser beams received by the laser scanning receiver 130 that is smaller than the gap produced by the uncrushed closure profiles. Accordingly, the PLC will compute the thickness of the crushed closure profiles as well. The instant of time at which the leading edge of the crushed section 24 of the closure profiles crosses the path of the curtain of laser beams 132 can thus be determined by detecting the change in thickness of the closure profiles (i.e., the change in height of the gap in the curtain of scanned laser beams), which is measured continuously as the fastener tape is advanced.

The structure and operation of different types of laser scanning micrometers is well known in the art. One such device that is suitable for the present application is the LS-5000 Series high-speed laser scan micrometer commercially available from Keyence Corporation.

In accordance with a variation of the optical detection technique depicted in FIG. 4, the PLC can be programmed to detect a change in the height of the gap in the curtain of scanned laser beams caused by the intervention of a slider, which has a lateral dimension much greater than the thickness of the uncrushed closure profiles.

Figure 5:
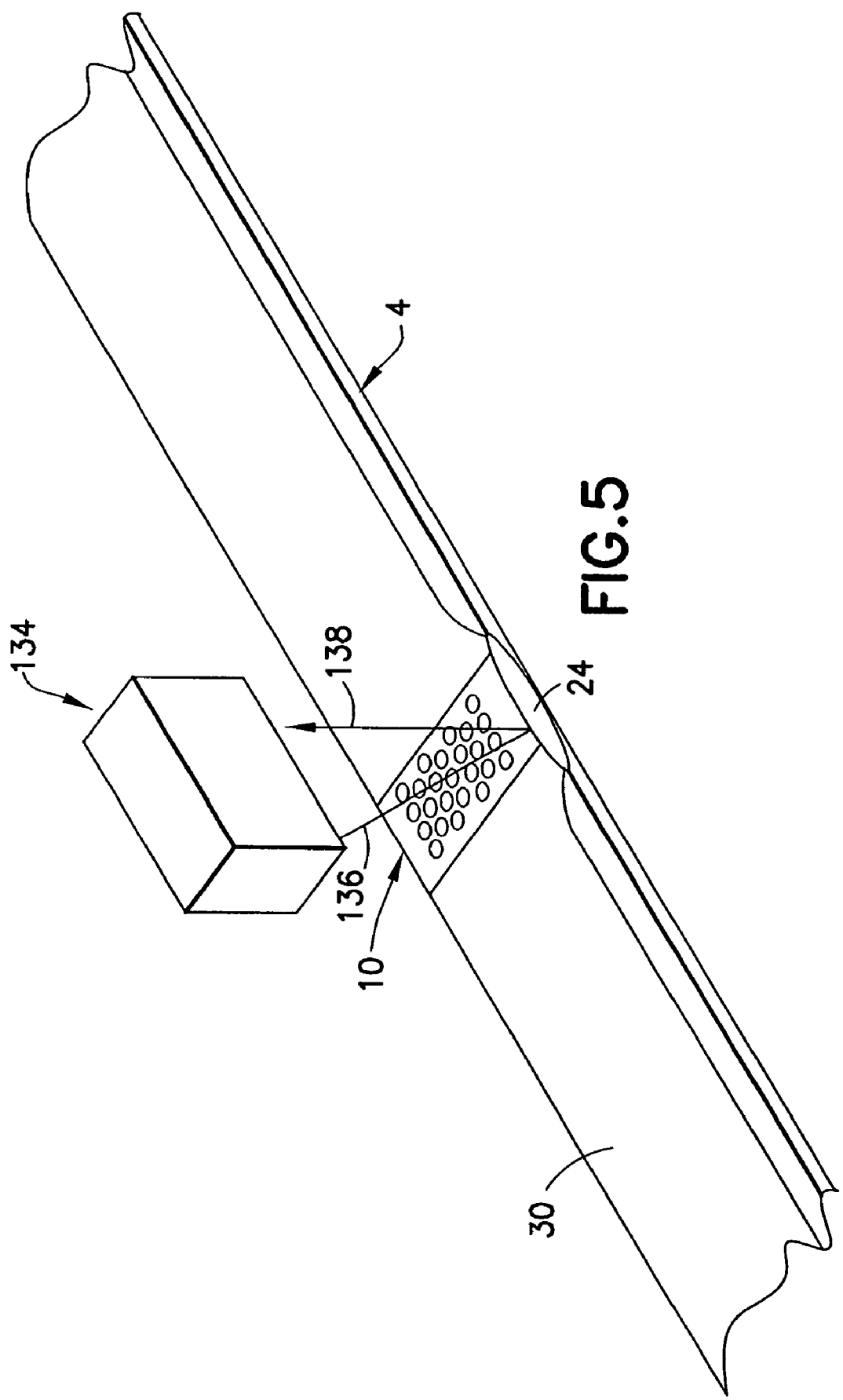
FIG. 5 is an isometric view of a laser displacement sensor being used to detect a zone where the closure profiles are flattened and fused together in accordance with a further embodiment of the present invention.

A method of optically detecting structural features formed on or attached to a fastener tape in accordance with a further embodiment of the invention is shown in FIG. 5. Again, the fastener tape 4 is the same as that previously described with reference to FIG. 1, except that no sliders are shown in FIG. 5. This method employs a laser displacement sensor 134, which transmits a laser beam 136 onto the fastener tape 4 (e.g., onto the closure profiles thereof) and then detects a reflected portion 138 of the transmitted laser beam. In the optical detection technique depicted in FIG. 5, the transmitted laser beam 136 is directed onto the closure profiles. As the fastener tape advances along a process pathway, the structure of the closure profiles exposed to the laser beam changes. Over the major portion of each package-length section of the fastener tape, the laser beam is reflected off of an angled surface of one of the uncrushed closure profiles (the angled outer surfaces of the uncrushed closure profiles can be seen in FIG. 2). The angle of the beam reflected from the uncrushed closure profile may be such that the beam impinges upon the light-receiving element of the laser displacement sensor at a particular location. In the area 24 where the closure profiles are crushed and fused, the angle of the reflected beam will be different than the angle of the beam reflected from the uncrushed portion. More specifically, the beam reflected from the crushed portion will impinge upon the light-receiving element of the laser displacement sensor at a location different than the location where the beam reflected from the uncrushed portion impinged. The laser displacement sensor uses a triangulation measurement system to produce electrical signals representative of the distance to the detected surface, which signals are output to the PLC (not shown in FIG. 5), enabling the latter to determine the respective instants of time when the leading and lagging edges of the crushed portion of the closure profiles cross the path of the transmitted laser beam 136.

The technique of triangulating distance to the surface of an object using lasers and multi-element detector arrays is well known in the art. Distance measurement is accomplished when an optical beam is projected out from a source and strikes the object surface. The beam is then viewed by a camera that is displaced from the axis of projection of the beam by some baseline distance. The camera is angled so that the laser beam crosses the field of view of the camera. When the beam strikes a surface at a point within the field of view of the camera, light reflected from that point is typically imaged by a lens onto the camera's detector. The detector may be either a continuous device such as a position sensing detector (PSD), which generates an electrical signal proportional to the position of the spot image on the PSD, or a linear charge coupled device (CCD) array, which consists of a single line of photodiode detector elements, each of which generates an electrical signal in proportion to the amount of light falling on it. The signal from the camera is typically processed by a microprocessor or other electronic logic which determines the location of peak light intensity on the camera, and a calibration table and/or equation is used to translate this location among the camera's pixels to a distance from the sensor. The data is then output in a form that can be read and used by, for example, a PLC.

One device suitable for the present application is the LK Series CCD laser displacement sensor commercially available from Keyence Corporation. In this device, a laser beam is generated by a laser diode and passed through a transmitter lens. The light reflected by the target passes through a receiver lens that focuses the light on the CCD. The CCD detects the pixel where the peak value of the light quantity distribution of the beam spot occurs.

The optical detection techniques disclosed herein can be used in any situation wherein the instant of time at which a structural feature on a moving fastener tape arrives at a fixed location must be determined during automated production of reclosable packaging. One application of the optical detection techniques disclosed herein will now be described with reference to FIGS. 6-8, which show portions of a thermoform-fill-seal (TFFS) machine that operates in conjunction with a fastener tape processing machine.

Figure 6:
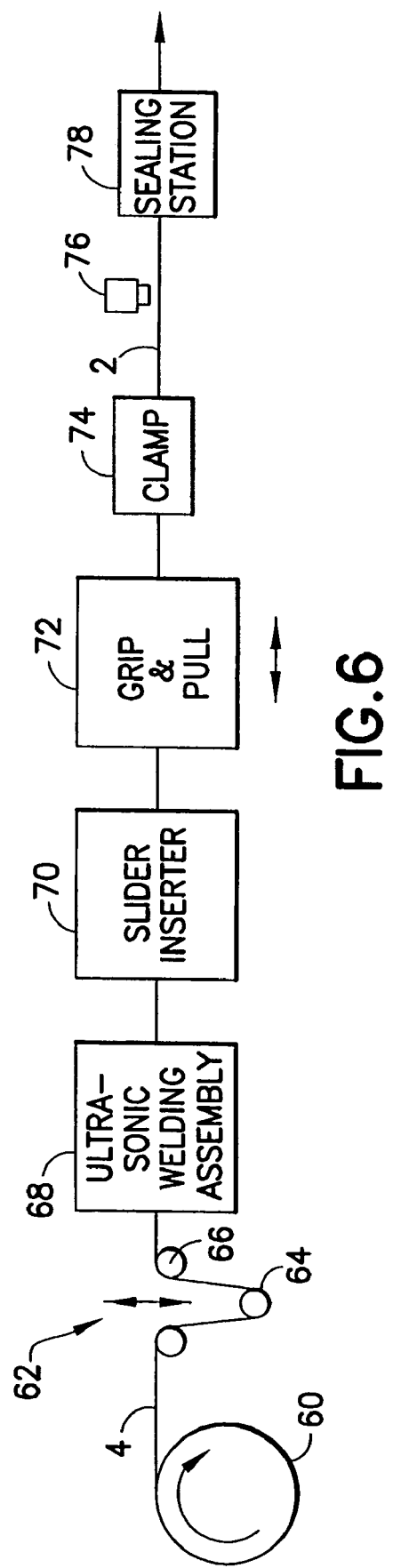
FIG. 6 is a block diagram representing automated equipment for inserting sliders and forming slider end stop structures on a fastener tape and then joining the fastener tape to packaging material. The automated equipment also incorporates a sensor for detecting reoccurring structural features on the fastener tape, which sensor may be one of the types depicted in FIGS. 3-5.
Figure 7:
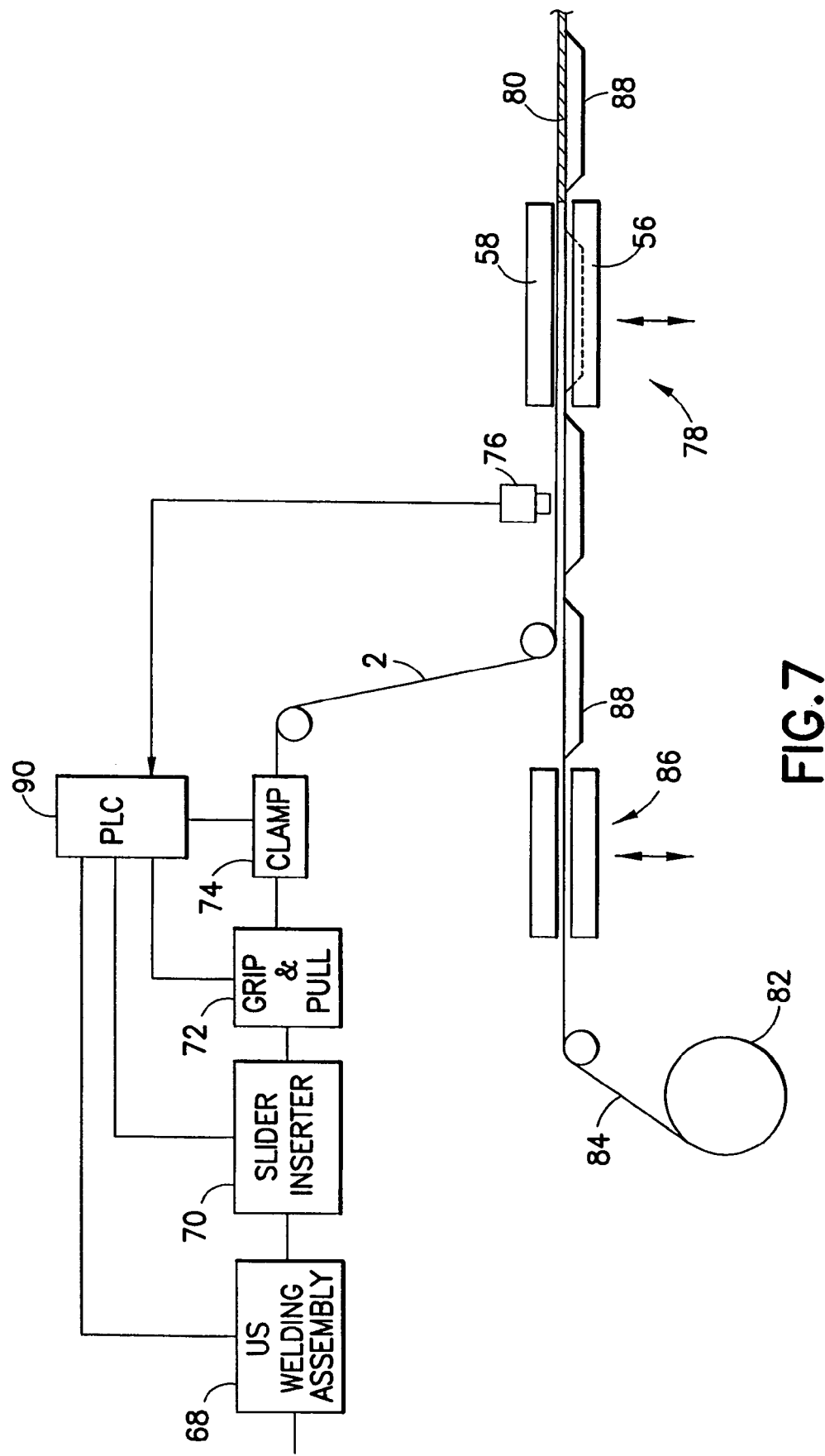
FIG. 7 is a drawing showing the automated equipment of FIG. 6 wherein the sealing station is incorporated in a thermoform-fill-seal (TFFS) machine.
Figure 8:
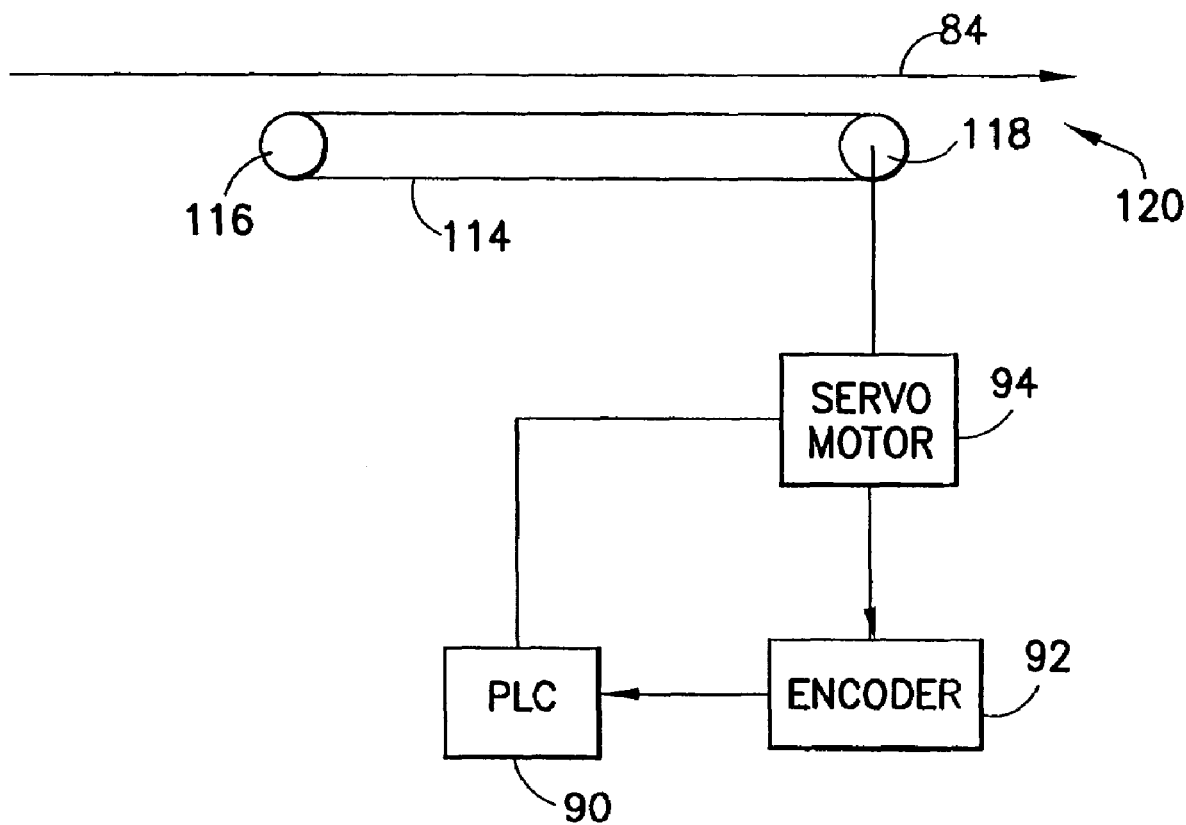
FIG. 8 is a block diagram showing a subsystem for providing a programmed logic controller with counting signals during advancement of the packaging material in a TFFS machine, which signals are used in conjunction with feedback from the sensor that detects reoccurring structural features on the advancing fastener tape.

Each thermoformed package is manufactured with a slider-operated zipper. Only one component of the TFFS machine, namely, a sealing station 78, where the fastener tape is joined to a bottom web of packaging material, is shown in FIG. 6. Various known components of the TFFS machine that are disposed upstream of the sealing station 78 are shown in FIG. 7. Various known components of the TFFS machine that are disposed downstream of the sealing station 78 are generally represented in FIG. 8.

Referring to FIG. 6, a length of thermoplastic fastener tape 4 (the sliders are not shown), comprising, e.g., respective continuous lengths of a pair of interlocked flanged zipper strips (e.g., of the type shown in FIG. 2), is unwound from a supply reel of a powered unwind stand 60 and passed through an unwind dancer assembly 62. The latter comprises a weighted dancer roller 64 that is supported on a shaft, which shaft is freely vertically displaceable (as indicated by the double-headed arrow in FIG. 6) along a slotted support column (not shown). The weight of the dancer roller 64 takes up any slack in the portion of the fastener tape suspended between the supply reel 60 and a guide roll 66. A sensor (not shown in FIG. 6) may be provided for detecting the vertical position of the dancer roller 64. The feedback signal from that sensor is used by a PLC (not shown in FIG. 2) to control the motor that powers the unwind stand 60, thereby controlling the payout of fastener tape 4.

An ultrasonic welding assembly 68 is disposed downstream of the guide roll 66. During each dwell time, the plastic zipper strips are softened and/or melted and shaped by the ultrasonic welding assembly in a respective zone. The ultrasonically welded plastic material of the respective zipper strips is shaped to form a respective slider end stop structure in each zone upon cooling. The deformed portions of the zipper strips are also fused together in each zone. Each slider end stop structure will form back-to-back slider end stops when the end stop structure is cut during bag formation. The ultrasonic welding assembly 68 may comprise an ultrasonic transducer acoustically coupled to a horn, the horn being opposed by an anvil (not shown in FIG. 6). Either the horn or the anvil or both reciprocate between retracted and extended positions. The ultrasonic transducer is activated and the horn and/or anvil is extended in response to activation signals from the PLC (not shown in FIG. 6). While a portion of the fastener tape is being pressed between the horn and anvil, the horn emits ultrasonic wave energy at an intensity and frequency designed to soften and/or melt the thermoplastic fastener tape during each dwell time. The horn and/or anvil may be provided with recesses designed to form the softened and/or molten thermoplastic material into a slider end stop structure. When the softened/melted material cools, the material of the respective zipper strips fuses together to form a zipper joint.

The ultrasonically welded and shaped portion of fastener tape is then advanced to the next station, comprising a conventional slider insertion device 70 that inserts a respective slider (not shown in FIG. 6) onto each package-length section of fastener tape during each dwell time. Each slider is inserted adjacent a respective slider end stop structure on the continuous fastener tape. The slider insertion device comprises a reciprocating pusher that is alternately extended and retracted by an air cylinder (not shown in FIG. 6). The pusher of the slider inserter 70 is extended in response to activation signals from the PLC. As the pusher extends, it pushes the slider onto the fastener tape. The other parts of such a slider insertion device, including a track along which sliders are fed, are well known and will not be described in detail herein.

During each dwell time, the fastener tape 4 is gripped by a clamp 74, so that the unwound length of fastener tape spanning the distance between guide roller 66 and clamp 74 is stationary during ultrasonic welding and slider insertion. The clamp 74 may comprise a clamping gripper assembly of the type disclosed in U.S. patent application Ser. No. 11/081, 369 and entitled "Apparatus for Repeatedly Advancing Fastener Tape a Predetermined Distance". This clamping gripper assembly comprises a pair of oppositely moving gripper arms (not shown). When the clamping gripper assembly is in a closed state, respective gripper pads on the gripper arms grip a first section of the length of straight zipper material. The gripper arms are actuated by a double-acting parallel motion air cylinder (not shown in FIG. 6), which is controlled by the aforementioned PLC. The clamping gripper assembly may comprise a carriage that is slidable along a straight rail to allow adjustment of its longitudinal position. But once the adjustment has been made, the clamping gripper assembly is secured relative to the rail, e.g., by means of a thumbscrew, so that the clamping gripper assembly is stationary during machine operation.

At the end of each dwell time, the fastener tape is gripped by a grip-and-pull mechanism 72 and then released by the clamp 74. Also, the ultrasonic horn or anvil or both are retracted and the pusher of the slider inserter is retracted, so that the length of fastener tape is free to advance. Then the grip-and-pull mechanism 72 is operated to pull the unwound length of fastener tape (ultrasonically stomped and carrying sliders) forward a desired distance. As will be explained in detail below, in accordance with one embodiment, the stroke of the grip-and-pull mechanism 72 is adjusted to be approximately equal to the distance that the bottom web of packaging material moves in the TFFS machine during each advancement. [Alternatively, if means are provided for stretching the section of fastener tape being sealed to the bottom web in the packaging machine, the stroke of the grip-and-pull mechanism 72 is adjusted to be approximately equal to the distance that the bottom web of package material moves during each advancement less any increase in the length of the fastener tape caused by the stretching.] During pulling of the portion of the fastener tape disposed upstream of the clamp 74, the most recently inserted slider leaves the slider insertion zone and the most recently formed slider end stop structure is moved from the ultrasonic welding station to the slider insertion zone. The clamp 74 is then closed again, following which the grip-and-pull mechanism 72 is opened and returned to its home position.

The grip-and-pull mechanism 72 may comprise an indexing gripper assembly that is linearly displaced by an indexing drive mechanism as disclosed in the aforementioned U.S. patent application Ser. No. 11/081,369. The indexing gripper assembly comprises a carriage that rides on a straight rail. The indexing drive mechanism comprises a lead screw driven to rotate by a servomotor under the control of the PLC. The indexing gripper assembly further comprises a nut threadably coupled to the lead screw and rigidly coupled to the carriage. The nut converts the rotation of the lead screw into linear displacement of the carriage. The indexing gripper assembly further comprises a pair of oppositely moving gripper arms. When the indexing gripper assembly is in a closed state, respective gripper pads on its gripper arms grip a second section (disposed upstream of the clamped first section) of the length of fastener tape. The gripper arms of the indexing gripper assembly are actuated by a double-acting parallel motion air cylinder, which is again controlled by the PLC.

Downstream from the clamp 74, the slider/fastener tape assembly 2 passes in front of a sensor 76 and then through a sealing station 78. As seen in FIG. 6, the sensor 76 is disposed between the clamp 74 and the sealing station 78. In this particular example, the sensor 76 is arranged to detect the leading edge of a respective slider end stop structure on the fastener tape as the slider end stop structure passes in front of the sensor during each intermittent advancement. (Alternatively, the sensor could be arranged to detect the leading edge of each slider or the leading edge of each flange seal, as previously disclosed.) During each dwell time, the section of fastener tape resident at sealing station 78 is joined by conductive heat sealing to a corresponding section of the bottom web of packaging material (not shown in FIG. 6, but see FIG. 7).

Various known components of the TFFS machine that are disposed upstream of the sealing station 78 are shown in FIG. 7. The components shown in FIG. 7 that bear reference numerals previously seen in FIG. 6 have the functionality previously described.

Still referring to FIG. 7, the bottom web 84 is unrolled from a supply roll 82 and pulled through a thermoforming station 86, where a respective trough 88 for product is formed by deep-drawing using vacuum and heat during each dwell time. One trough is formed for each package-length section of web 84, but the trough is surrounded by a perimeter of packaging material that is not thermoformed, including a lateral margin where a package-length section of the slider/fastener tape assembly 2 will be attached. The thermoformed bottom web 84 is advanced to the sealing station 78, where a respective package-length section of fastener tape is joined to each package-length section of the bottom web.

More specifically, a respective section of the slider/fastener tape assembly 2 (comprising a pair of interlocked zipper strips with a respective slider mounted thereon) is joined to the bottom web 84 by conventional conduction heat sealing during each dwell time. This may be accomplished by a reciprocating heated sealing bar 56 arranged below the bottom web 84. The sealing bar 56 reciprocates between retracted and extended positions under the control of the PLC 100. In the extended position, the heated (i.e., "hot") sealing bar 56 presses against a stationary unheated (i.e., "cold") bar 58, with the flanges of the zipper strips and the non-thermoformed margin of the bottom web sandwiched therebetween. When sufficient heat and pressure are applied, the bottom web 84 is joined to the flange of the lower zipper strip by conductive heat sealing. To prevent seal-through of the zipper flanges, just enough heat is conducted into the zipper material from the hot sealing bar. Alternatively, a separating plate may be interposed between the flanges during sealing, or the zipper flanges may have a laminated construction comprising sealant layers on the exterior surfaces or non-sealant layers on the interior surfaces.

As a result of the joinder of certain sections of the slider/fastener tape assembly 2 to the bottom web 84 of the packaging material, the section of the slider/fastener tape assembly disposed immediately upstream of the sealing station 78 will be pulled forward during each intermittent advancement of the bottom web 84.

Preferably, the sensor 76 is fixed at a location that will lie between successive slider end stop structures (or sliders or flange seals) upon completion of each intermittent advancement, i.e., during each dwell time. For example, the sensor 76 may be located midway between successive slider end stop structures of the section of the stationary fastener tape disposed in front of the sensor. During each advancement, the sensor 76 provides feedback signals to the PLC 100 that contain information indicating the precise instant of time when the leading edge of the slider end stop structure (or slider or flange seal) passed a precise location relative to the sensor. Any suitable optical detecting means can be used. Several embodiments of suitable optical detecting means are shown in FIGS. 3-5.

The PLC 100 then uses that information, with other information from the TFFS machine (described later with reference to FIG. 8), to adjust the stroke of the grip-and-pull mechanism 72 in a manner that maintains proper registration of the slider end stop structures relative to the thermoformed troughs 20 of a bottom web 16 of packaging material. In response to a sensor feedback signal indicating the instant when the leading edge of the attachment or modified structure is detected, the PLC 100 correlates that event with a count signal representing the position of the concurrently advancing bottom web 84. Each leading edge detection event is correlated with a respective count, thereby enabling the PLC to compare the distance between successive leading edges to the distance by which the bottom web has advanced, which distance is directly proportional to the count A subsystem for providing the count signal (representing the advancement of the bottom web) to the PLC 100 is generally depicted in FIG. 8. The bottom web 84 may be intermittently advanced by conventional means 120. The portion of the bottom web 84 paid out from the bottom web supply roll (item 82 in FIG. 7) is advanced by a pair of endless chain belts 114 (only one of which is depicted in FIG. 8, the other being directly behind) that circulate on respective sprocket wheels 116 and 118, the latter of which is driven as explained below. In a known manner, spring-loaded clamps (not shown in FIG. 8) are mounted to both chain belts 114 for clamping the lateral margins of the bottom web 84. As the chain belts 114 circulate, the clamps carried thereon pull the bottom web through the sealing station (78 in FIG. 7). The structural details concerning the various components of the web advancing means 120, such as spring-loaded clamps, respective bearing-mounted sprocket wheels and respective engagement discs associated with the sprocket wheels and serving to open the spring-loaded clamps, are disclosed in full in U.S. Pat. No. 4,826,025 and will not be described in detail herein. Alternatively, a pair of drive belts that bear against the lateral margins of the bottom web could be used in place of the chain belts with spring-loaded clamps.

Still referring to FIG. 8, rotation of the sprocket wheel 118 is driven by a servomotor 94, which is controlled by the PLC 100. During operation of the TFFS machine, the PLC 100 is programmed to activate the servomotor 94 at regular intervals interspersed with dwell times. During each activation, the servomotor 94 causes the bottom web 84 to be advanced by a constant indexing distance equal to one package length. The shaft of servomotor 94 is coupled to an encoder 92 that encodes shaft rotation by outputting a number proportional to the angle of rotation. That number, which is also proportional to the distance that the bottom web is advanced, is provided as feedback to the PLC 100. Provided that the servomotor 94 is activated in a repeatable manner, the number output by the encoder 92 will increase by the same amount for each intermittent advancement of the bottom web. For example, the encoder count might increase by 1000 for each package-length advancement of the bottom web. This increasing count will be provided as feedback from the encoder 92 to the PLC 100.

The PLC 100 is programmed to adjust the distance between the leading edges of successive slider end stop structures (or other modifications) or sliders (or other attachments) to compensate for any variation from one package length. The PLC accomplishes this by adjusting the forward stroke of the grip-and-pull mechanism.

For the exemplary implementation wherein one package length=1000, assume that the encoder count is 1500 when the n-th leading edge is detected and 2480 when the (n+1)-th leading edge is detected. The difference in these counts is 2480−1500=980, meaning that the distance between the n-th and the (n+1)-th leading edges deviates by −2% from one package length (=1000). To adjust for this deviation, PLC 100 controls the grip-and-pull mechanism to increase its forward stroke by a distance equal to 2% of one package length. In general, if the count separating leading edge detection events deviates from the count representing one package length by −x%, then the forward stroke of the grip-and-pull mechanism will be increased by a distance equal to x% of one package length. Conversely, if the count separating leading edge detection events deviates from the count representing one package length by +x%, then the forward stroke of the grip-and-pull mechanism will be decreased by a distance equal to x% of one package length. This is only one possible algorithm that can be used. A person skilled in the art will readily appreciate that many different algorithms could be employed to adjust the distance between successive leading edges of structural features repeatedly attached or formed on the fastener tape. For example, the adjustment to the stroke of the grip-and-pull mechanism could be a function of a moving average deviation over multiple work cycles.

In accordance with one implementation, the PLC 100 controls all of the activatable components depicted in FIGS. 6-8. More specifically, the PLC is programmed to control various solenoids that open various strategically placed valves that, when open, connect a source of compressed air to various air cylinders. These air cylinders in turn respectively actuate movement of various components represented in FIG. 6, such as the following: (a) an indexing gripper assembly of the grip-and-pull mechanism 72; (b) a stationary gripper assembly of the clamp 74; (c) a horn (or anvil) of the ultrasonic welding assembly 68; and (d) a pusher of the slider insertion device 70. The PLC 100 also controls a waveform generator that supplies an electrical waveform to an ultrasonic transducer, which transducer in turn outputs acoustic waves that are delivered to the fastener tape by the aforementioned horn of the ultrasonic welding assembly 68. In addition, the PLC 100 controls various servomotors including the following: (a) a servomotor (not shown in FIG. 6) that drives rotation of a lead screw of the grip-and-pull mechanism 72, which rotation is converted into linear displacement of the indexing gripper assembly by means of the type previously described: (b) a servo motor (not shown in FIG. 6) that drives rotation of the power unwind stand 60; and (c) the servomotor 94 (shown in FIG. 8) that drives advancement of the bottom web through the packaging machine. The PLC 100 also controls the operations of the thermoforming station 86 and the various sealing stations, the sealing station 78 for joining the bottom web to the fastener tape being the only sealing station depicted in FIG. 7.

Furthermore, as previously explained in detail, the PLC 100 receives feedback from the sensor 76 (see FIG. 7) and the encoder 92 (see FIG. 8), and then controls the servomotor that drives rotation of the lead screw of the grip-and-pull mechanism 72 (see FIG. 7). By controlling that the number of revolutions of the servomotor, the PLC can adjust the forward stroke of the grip-and-pull mechanism 72 to advance the fastener tape by a desired distance. As previously explained, the adjustment is a function of the discrepancy between the distance separating successive leading edges of the slider end stop structures (or the sliders), which distance is detected by the sensor 76, and the distance by which the bottom web is advanced, which is reflected in the change in the count from the encoder 92 as the result of each bottom web advancement.

The PLC 100 is programmed to control the various components in accordance with a regular work cycle. In particular, the TFFS machine and the zipper processing machine must be coordinated such that the bottom web of packaging material and the fastener tape are both stationary during each dwell time and are both advanced during the remainder of each work cycle. Accordingly, during the advancement phase, the PLC 100 activates the servomotor of the power unwind stand 60 to pay out wound fastener tape; activates the servomotor of the grip-and-pull mechanism 72 to advance previously paid-out fastener tape; and activates the servomotor 94 of the web advancement mechanism to advance the bottom web. During this phase, the clamp 74 is open. At the end of the forward stroke of the grip-and-pull mechanism 72, the clamp 74 is closed, thereby gripping the portion of fastener tape thereat. Once the fastener tape has been gripped by the clamp, the ultrasonic welding assembly 68 and the slider insertion device 70 are activated in the zipper processing machine, and the thermoforming station 86 and the sealing station 78 (and other sealing stations) of the TFFS machine are activated. While these operations are being performed, the PLC 100 activates the servomotor of the grip-and-pull mechanism 72 to cause the grip-and-pull mechanism 72 to return to its home position and await the next advancement phase. During each advancement phase, the PLC 100 receives feedback from the sensor 76 and the encoder 92, as previously described in detail. Naturally the PLC also controls other components such as the evacuation means and the cutting means of the TFFS machine. The PLC 100 is typically a computer or processor having associated memory that stores a program for operating the machine.

The various components that move between retracted and extended positions (e.g., slider pusher, ultrasonic horn, clamp, sealing bar, etc.) may be coupled to respective double-acting pneumatic cylinders (not shown in FIG. 6). Operation of the cylinders is controlled by the PLC 100, which selectively activates the supply of fluid to the double-acting cylinders in accordance with an algorithm or logical sequence. Hydraulic cylinders can be employed as actuators in place of air, i.e., pneumatic, cylinders. A person skilled in the art of machinery design will readily appreciate that displacing means other than a cylinder can be used to displace components such as the horn of the ultrasonic welding assembly and the pusher of the slider inserter. For the sake of illustration, such mechanical displacement devices include rack and pinion arrangements or lead screw/coupling nut assemblies, rotation of the pinion or lead screw being driven by an electric motor.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the claims, the term "controller" means a programmed logic controller, an electronic computer, a central processing unit, a microchip, a microcontroller or other programmable device or a system of interconnected and synchronized control units, each control unit comprising a programmed logic controller, an electronic computer, a central processing unit, a microchip, a microcontroller or other programmable device. Also, in the absence of explicit language in any method claim setting forth the order in which certain steps should be performed, the method claims should not be construed to require that steps be performed in the order in which they are recited.

The invention claimed is:

1. A method of manufacture comprising the following steps:
   (a) during a respective indexing portion of a respective work cycle, advancing a fastener tape made of flexible thermoplastic material along a process pathway, said fastener tape not advancing during a respective dwell time of said respective work cycle;
   (b) during each dwell time, deforming said fastener tape in a respective zone that is resident at a first fixed station situated along said process pathway, said deformed zones being spaced at intervals along the portion of said fastener tape that is downstream of said first fixed station;
   (c) while said fastener tape is advancing along said process pathway during the indexing portion of each work cycle, transmitting light toward a volume of space at a second fixed station, said process pathway being arranged such that said deformed zones intersect and pass through said volume of space during advancement of said fastener tape; and
   (d) photodetecting at least portions of said transmitted light after some or all of said transmitted light has entered and then exited said volume of space at said second fixed station, said photodetected portions of said transmitted light being converted into electrical signals that indicate a time when transmitted light impinges on an edge of a deformed zone as said deformed zone passes through said volume of space,
   wherein the distance that said fastener tape is advanced in step (a) during an indexing portion of a particular work cycle is determined in accordance with an algorithm that takes into account characteristics of electrical signals acquired in step (d) during earlier work cycles.

2. The method as recited in claim 1, wherein said fastener tape comprises first and second zipper strips, said first zipper strip comprises a first closure profile and a first zipper flange connected to said first closure profile, said second zipper strip comprises a second closure profile and a second zipper flange connected to said second closure profile, and each of said deformed zones is a respective zone where said first and second zipper flanges are fused together.

3. The method as recited in claim 1, wherein said fastener tape comprises first and second zipper strips, said first zipper strip comprises a first closure profile, said second zipper strip comprises a second closure profile, and each of said deformed zones is a respective zone where said first and second closure profiles are flattened and fused together.

4. The method as recited in claim 1, wherein said photodetected portions of said transmitted light have been passed through said fastener tape.

5. The method as recited in claim 4, further comprising the step of processing said electrical signals to detect a change in translucence along the length of said fastener tape.

6. The method as recited in claim 1, wherein said photodetected portions of said transmitted light have been reflected from said fastener tape.

7. The method as recited in claim 6, further comprising the step of processing said electrical signals to detect a change in the angle of reflection of said reflected light along the length of said fastener tape.

8. The method as recited in claim 1, wherein said photodetected portions of said transmitted light have not impinged upon said fastener tape.

9. The method as recited in claim 1, further comprising the step of processing said electrical signals to detect a change in the thickness of said fastener tape in a deformed zone.

10. The method as recited in claim 1, wherein step (c) comprises scanning a beam of light across said volume of space.

11. A method of manufacture comprising the following steps:
   (a) during a respective indexing portion of a respective work cycle, advancing a fastener tape made of transparent or translucent flexible thermoplastic material along a process pathway, said fastener tape not advancing during a respective dwell time of said respective work cycle;
   (b) during each dwell time, inserting a respective slider on the portion of said fastener tape that is resident at a first fixed station situated along said process pathway, said sliders being spaced at intervals along the portion of said fastener tape that is downstream of said first fixed station, each slider being substantially opaque;
   (c) while said fastener tape is advancing along said process pathway during the indexing portion of each work cycle, transmitting light toward a portion of said fastener tape in a volume of space at a second fixed station, respective portions of said sliders also passing through said volume of space; and
   (d) photodetecting those portions of said transmitted light that pass through the portion of said fastener tape resident in said volume of space and that are not blocked by a slider; said photodetected portions of said transmitted light being converted into electrical signals that undergo a change in amplitude in response to a leading edge of said slider moving into the path of said transmitted light, wherein the distance that said fastener tape is advanced in step (a) during an indexing portion of a particular work cycle is determined in accordance with an algorithm that takes into account characteristics of electrical signals acquired in step (d) during earlier work cycles.

12. A method of manufacture comprising the following steps:
   (a) during a respective indexing portion of a respective work cycle, advancing a fastener tape along a process pathway, said fastener tape not advancing during a respective dwell time of said respective work cycle, and said fastener tape comprising first and second zipper strips made of flexible thermoplastic material;
   (b) during each dwell time, deforming and fusing respective portions of said first and second zipper strips that are resident at a first fixed station situated along said process pathway to form a respective zone of fusion, said zones of fusion being spaced at intervals along the portion of said fastener tape that is downstream of said first fixed station;
   (c) while said fastener tape is advancing along said process pathway during the indexing portion of each work cycle, transmitting light toward a volume of space at a second fixed station, said process pathway intersecting and passing through said volume of space; and
   (d) photodetecting at least portions of said transmitted light after some or all of said transmitted light has entered and then exited said volume of space at said second fixed station, said photodetected portions of said transmitted light being converted into electrical signals,
   wherein the distance that said fastener tape is advanced in step (a) during an indexing portion of a particular work cycle is determined in accordance with an algorithm that takes into account characteristics of electrical signals acquired in step (d) during earlier work cycles.

13. The method as recited in claim 12, wherein said first zipper strip comprises a first closure profile and a first zipper flange connected to said first closure profile, said second zipper strip comprises a second closure profile and a second zipper flange connected to said second closure profile, and each of said zones of fusion is a respective zone where said first and second zipper flanges are fused together.

14. The method as recited in claim 12, wherein said first zipper strip comprises a first closure profile, said second zipper strip comprises a second closure profile, and each of said zones of fusion is a respective zone where said first and second closure profiles are flattened and fused together.

15. The method as recited in claim 12, wherein said photodetected portions of said transmitted light have been passed through said fastener tape, further comprising the step of processing said electrical signals to detect a change in translucence along the length of said fastener tape.

16. The method as recited in claim 12, wherein said photodetected portions of said transmitted light have been reflected from said fastener tape, further comprising the step of processing said electrical signals to detect a change in the angle of reflection of said reflected light along the length of said fastener tape.

17. The method as recited in claim 12, wherein said photodetected portions of said transmitted light have not impinged upon said fastener tape, further comprising the step of processing said electrical signals to detect a change in the thickness of said reflected light along the length of said fastener tape.

* * * * *